United States Patent
Xie et al.

(10) Patent No.: US 8,117,063 B2
(45) Date of Patent: Feb. 14, 2012

(54) SYSTEM AND METHODS FOR CREATING PROBABILISTIC PRODUCTS AND FOR FACILITATING PROBABILISTIC SELLING

(75) Inventors: Jinhong Xie, Gainesville, FL (US); Scott Alan Fay, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 1125 days.

(21) Appl. No.: 11/940,746

(22) Filed: Nov. 15, 2007

(65) Prior Publication Data

US 2008/0114706 A1      May 15, 2008

Related U.S. Application Data

(60) Provisional application No. 60/866,008, filed on Nov. 15, 2006.

(51) Int. Cl.
*G06Q 10/00* (2006.01)
*G06Q 20/00* (2006.01)
*G06Q 30/00* (2006.01)

(52) U.S. Cl. ............. 705/7.35; 705/14.1; 705/20
(58) Field of Classification Search ............... None
See application file for complete search history.

(56) References Cited

U.S. PATENT DOCUMENTS

| | | | |
|---|---|---|---|
| 5,794,207 A | 8/1998 | Walker et al. | |
| 6,684,195 B1* | 1/2004 | Deaton et al. | 705/14.13 |
| 6,826,538 B1 | 11/2004 | Kalyan et al. | |
| 7,092,929 B1 | 8/2006 | Dvorak et al. | |
| 7,181,419 B1* | 2/2007 | Mesaros | 705/26.2 |
| 2002/0077982 A1* | 6/2002 | Pellegrini | 705/41 |
| 2002/0138342 A1* | 9/2002 | Clark et al. | 705/14 |
| 2003/0220836 A1* | 11/2003 | Mortimer | 705/14 |
| 2005/0060324 A1 | 3/2005 | Johnson et al. | |
| 2005/0075928 A1* | 4/2005 | Ariely | 705/14 |
| 2006/0229947 A1* | 10/2006 | Rossides | 705/14 |
| 2007/0022021 A1* | 1/2007 | Walker et al. | 705/26 |

(Continued)

FOREIGN PATENT DOCUMENTS

WO    WO 2005/008451    1/2005

OTHER PUBLICATIONS

Jeffrey O. Kephart, Scott A. Fay, Competitive bundling of categorized information goods, Proceedings of the 2nd ACM conference on Electronic commerce, p. 117-127, Oct. 17-20, 2000, Minneapolis, Minnesota, United States.*

(Continued)

*Primary Examiner* — Lynda Jasmin
*Assistant Examiner* — Sujay Koneru
(74) *Attorney, Agent, or Firm* — Cantor Colburn LLP

(57) ABSTRACT

A method for creating a probabilistic product is provided. The method includes creating a set of product identifiers corresponding to a plurality of products offered by a single seller, each of the plurality of product identifiers uniquely corresponding to one of the plurality of products. The method also includes selecting a subset of the product identifiers. Additionally, the method includes generating a plurality of probability values, each probability value uniquely corresponding to one of the product identifiers contained in the subset, and the sum of the probability values being equal to one. The method further includes determining a monetary value, defining a selling price. By paying the selling price to the seller, a buyer subsequently receives a product associated with one of the product identifiers randomly chosen from the subset.

14 Claims, 7 Drawing Sheets

U.S. PATENT DOCUMENTS

2007/0100692 A1* 5/2007 Minifie et al. ............... 705/14
2007/0244766 A1* 10/2007 Goel ............................ 705/26
2008/0103851 A1* 5/2008 Walker et al. ................. 705/7

OTHER PUBLICATIONS

Venkatesh et al. "A Probabilistic Approach to Pricing a Bundle of Products or Services" (1993) Journal of Marketing Research 30, 4 (494-508).*

Fay et al. "The Economics of Buyer Uncertainy: Advance Selling vs. Probablistic Selling" (2009) (http://www.bm.ust.hk/mark/workshop/may2009/Jinhong.pdf).*

Fay et al. "Probabilistic Goods: A Creative Way of Selling Products and Services" (2008) Marketing Science, pp. 1-17.*

Shugan et al. "Advance Selling for Services" (2004) Calfiornia Management Review, vol. 46, No. 3, p. 37-53.*

Shugan et al. "Advance-selling as a competitive marketing tool" (2005) International Journal of Research in Marketing, vol. 22, Issue 3.*

Xie et al. "Electronic Tickets, Smart Cards, and Online Prepayments: When and How to Advance Sell" (2001) Marketing Science, vol. 20, No. 3, pp. 219-243.*

* cited by examiner

SYSTEM AND METHODS FOR CREATING PROBABILISTIC PRODUCTS AND FOR FACILITATING PROBABILISTIC SELLING

CROSS-REFERENCE TO RELATED APPLICATIONS

This application claims the benefit of U.S. Provisional Application No. 60/866,008 filed Nov. 15, 2006, which is incorporated herein in its entirety.

FIELD OF THE INVENTION

The present invention is related to the fields of product generation and marketing, and more particularly, to techniques for creating probabilistic products and for facilitating the selling of such products.

BACKGROUND OF THE INVENTION

Providers of products and services face many challenges in marketing their respective products and services in a market-based economy. Because different consumers typically value the same product or service differently, one challenge for a provider is to distinguish between those consumers who place a higher value on a product or service from those consumers whose subjective valuation of the product or service is lower.

One technique for enlarging a provider's "producer surplus" is price discrimination. With price discrimination, those consumers whose subjective valuation of a product or service is higher are charged a higher price, while those consumers who place a lower value on a product or service are charged a lower price. Price discrimination can be effected, for example, using product lines, according to which different versions of the same basic product are offered by varying one or more attributes of the product. For example, a linen seller might offer multiple versions of bed sheets by varying the thread count so that a higher price could be obtained from consumers desiring a 500-thread count than that obtained from consumers who are content with only a 250-thread count. Accordingly, product lines can allow a seller to achieve higher unit sales (e.g., by allowing the seller to attract low-valuation customers) and/or allow the seller to generate higher average revenue per sale (e.g., by inducing high-valuation customers to pay higher prices.) The same technique can be applied in order to achieve price discrimination in the context of providing a particular service.

One disadvantage of product lines, however, is that compared to single products, multiple products can be much more expensive to create and sell. This primarily is because offering a product line with different versions of the same underlying product (e.g., sheets having different thread counts) requires separate design, manufacturing, marketing, and distribution processes for each of the products in the line. Another disadvantage to attempting to achieve price discrimination by offering a product line is that the strategy can diminish the producer's ability to benefit from economies of scale. For example, if unit cost declines with output, then producing 2,000 bed sheets that have a 500 thread count may be less costly than producing 1,000 units with a 500-thread count and 1,000 units with a 250-thread count.

Other mechanisms for price discrimination include techniques such as offering coupons, rebates, volume discounts, and/or senior discounts. Each of the mechanisms, however, has its own limitations or disadvantages. For example, senior discounts unnecessarily and likely sub-optimally provide discounts even to those seniors who are not sensitive to the product's price.

Another challenge facing product and service providers is demand uncertainty. The problem arises because it is often difficult for the producer to accurately predict future consumer demand for a particular product or service. If demand is unknown, the producer is more likely to sub-optimally set the asking price for the product or service. For example, a seller of handbags would ordinary prefer to set a higher price for handbags of a certain type or style that is likely to be this season's more fashionable one, while setting a lower price for less fashionable versions. Without being able to predict which version will be more fashionable, however, the seller's ability to set an optimal price at the outset is significantly constrained.

Moreover, when a seller has limited capacity, demand uncertainty can result in too much or too little of a product being produced or inventoried. In the event of the former, the seller typically endures the expense of producing unsold goods and possibly the cost of carrying excess inventory, whereas the latter event denies the seller the opportunity to fully exploit current market demand.

Various mechanisms for dealing with demand uncertainty have been proposed. For example, the airline industry has implemented sophisticated yield-management systems in an attempt to adjust prices over time so as to obtain the maximum revenue given a limited number of seats available for any particular flight. Nonetheless, the mechanisms are typically quite costly to design and implement.

Accordingly, there is a need for more effective and efficient mechanisms for dealing with these and other challenges facing product and service providers operating in a market-based economy.

SUMMARY OF THE INVENTION

The present invention is directed to systems and methods for creating probabilistic products. A probabilistic product is one for which a seller offers a potential buyer a gamble, namely, that of paying a set price in return for receiving one item drawn from a set of distinct items. The invention also is directed to systems and methods for facilitating probabilistic selling.

One embodiment of the invention is a method for creating a probabilistic product by varying one or more values of one or more predefined critical variables. The method can include creating a set of product identifiers corresponding to a plurality of products, each of the plurality of product identifiers uniquely corresponding to one of the plurality of products. The method also can include selecting a subset of the product identifiers. Additionally, the method can include generating a plurality of probability values, each probability value uniquely corresponding to one of the product identifiers contained in the subset, wherein the sum of the probability values equals one. The method further can include determining a monetary value, the value defining a selling price, wherein by paying the selling price to the seller, a buyer subsequently receives a product associated with one of the product identifiers randomly chosen from the subset, and wherein the probability of choosing a particular product identifier is equal to the probability value corresponding to the particular product identifier. The subset and corresponding probabilities define a single probabilistic product.

Another embodiment of the invention is a method of creating a probabilistic product by selecting a plurality of products from among an inventory of products offered by a single seller. The method can include associating a plurality of product identifiers with the selected plurality of products, each of the plurality of product identifiers uniquely corresponding to one of the plurality of products. The method further can include assigning a plurality of probability values, each probability value uniquely corresponding to one of the product identifiers.

The method, according to this embodiment, can additionally include determining a monetary value that defines or equals a selling price, wherein by paying the monetary value to the seller, a buyer will receive a product associated with one of the product identifiers randomly chosen from the subset, and wherein the probability of choosing a particular product identifier is equal to the probability value corresponding to the particular product identifier. Furthermore, according to this embodiment, the selling price can be determined based upon how many products are selected and/or the probabilities corresponding to each of the products selected.

Still another embodiment of the invention is a method for creating a probabilistic product by varying a plurality of predefined critical variables. The method can include creating a set of product identifiers corresponding to a plurality of products, each of the plurality of product identifiers uniquely corresponding to one of the plurality of products. Additionally, the method can include selecting a subset of the product identifiers, and generating a plurality of probability values, each of which uniquely corresponds to one of the product identifiers contained in the subset. The method also can include determining a monetary value, defining a selling price, wherein by paying the selling price to the seller a buyer will receive a product associated with one of the product identifiers randomly chosen from the subset, and wherein the probability of choosing a particular product identifier is equal to the probability value corresponding to the particular product identifier.

According to this particular embodiment, the method further can include conveying to a plurality of buyers at different network-connected nodes over a data communications network an offer for the probabilistic product, tracking each purchase of the probabilistic product, and storing related transactions information associated with each purchase. Additionally, the method can include selectively providing access to the related transactions information.

Yet another embodiment of the invention is a method of monitoring the selling of a probabilistic product. The method can include tracking purchases of at least one probabilistic product offered by at least one seller, the at least one probabilistic product being defined by a plurality of distinct products and a plurality of probabilities associated therewith, each of the probabilities uniquely corresponding to one of the distinct products. The method further can include generating transaction information associated with each of the purchases tracked.

BRIEF DESCRIPTION OF THE DRAWINGS

There are shown in the drawings, embodiments which are presently preferred. It is expressly noted, however, that the invention is not limited to the precise arrangements and instrumentalities shown.

DETAILED DESCRIPTION

Figure 1:
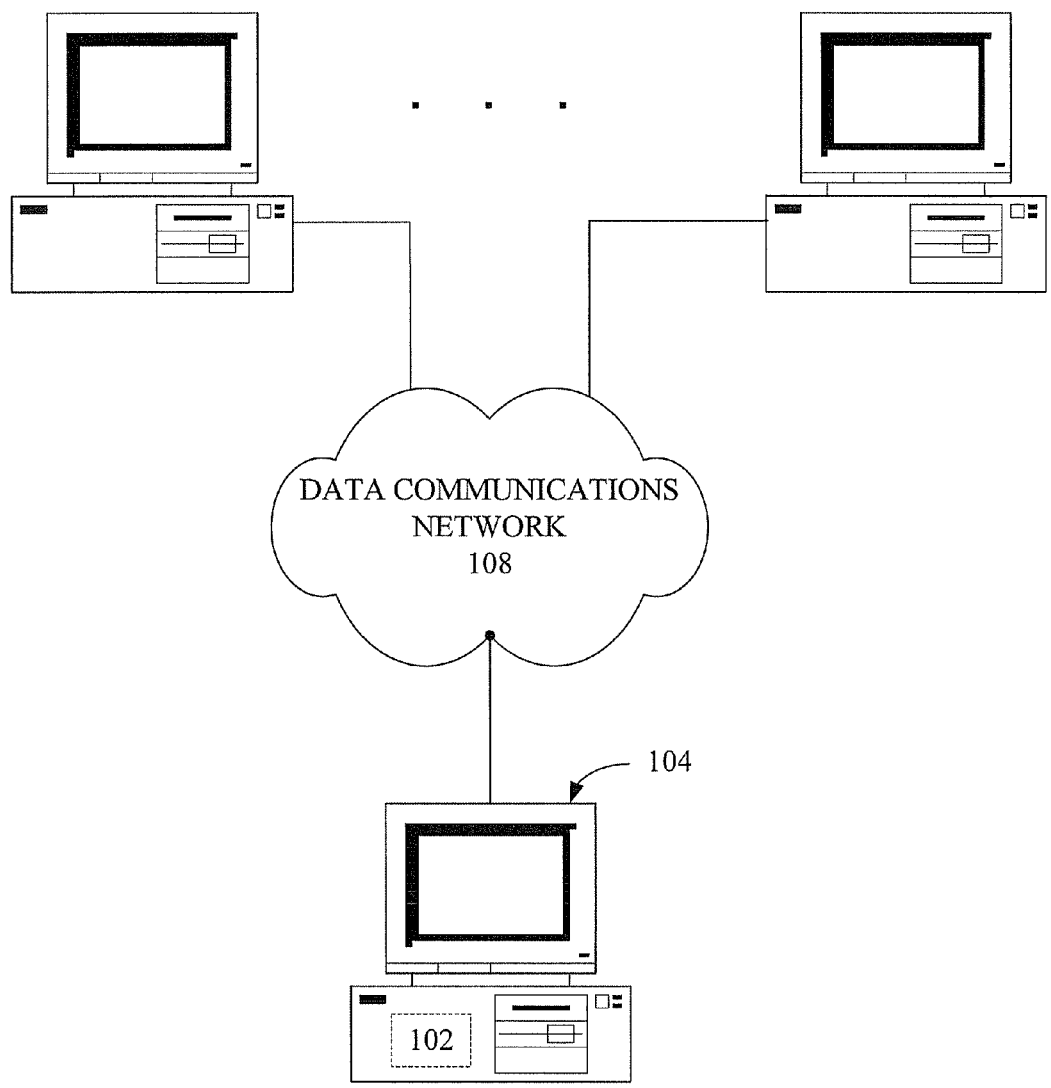
FIG. 1 is a schematic view of an exemplary environment in which a system for creating probabilistic products, according to one embodiment of the invention, is utilized.

The invention is directed to systems and methods for facilitating probabilistic selling. One aspect of the invention is a system and methods for creating probabilistic products. Another aspect of the invention is a technique for enhancing the seller's ability to sell probabilistic products by establishing the seller's credibility among actual and potential buyers of probabilistic products.

As described herein, the seller of a probabilistic product offers a potential buyer the opportunity to obtain one item drawn from a set of distinct items. According to one embodiment of the invention, the probability of obtaining any particular item is known to the potential buyer in advance. In an alternate embodiment, however, the probability of obtaining any particular item is not known to the potential buyer in advance.

The items can be different products or, alternatively, each can be the same basic product but having different attributes. For example, the probabilistic product could comprise different versions of a handbag, the different versions being distinguished according to color and/or quality of material. A purchaser of such a product could have, for example, a twenty percent chance of receiving a black handbag and/or one made of high-quality material, a thirty percent chance of receiving a grey handbag and/or one made of medium-quality material, and a fifty percent chance of receiving a brown handbag and/or one made of low-quality material.

Although the term "product" is used in the present description, it is explicitly noted that the term is intended to encompass services as well as products. Indeed, a probabilistic product alternately can be an event outcome. For example, the probabilistic product can comprise a set of tickets, each of the tickets being for admission to the same show on a different night or different shows on the same or different nights. Similarly, the probabilistic product could be a set of class registrations for university students, each registration being for a particular class at different times and/or taught by different professors, or for different classes taught at the same time and/or by the same professor.

Accordingly, there are an unlimited number of different probabilistic products that can be created according to the invention described herein. One defining characteristic of all probabilistic products, according to the invention, is that the probabilistic product, or more particularly, the set of distinct items comprising the probabilistic product, is defined by variable attributes for each item, the different gradations or values of each attribute, and the particular probabilities of drawing any one of the items whose attributes have particular values. As explained herein, different probabilistic products can be created by varying any of these critical variables; that is by varying the number of items, their different attributes, different values for each attribute, and/or probabilities associated with drawing items having particular values for each attribute.

FIG. 1 is a schematic diagram of an exemplary environment 100 in which a system 102 for creating probabilistic products, according to one embodiment, is utilized. The exemplary environment 100 illustratively includes a computer 104 on which the system 102, which is described more particularly below, resides. Additionally, the exemplary environment 100 illustratively includes one or more other computers 104 that link directly or via a data communications network 106 comprising a plurality of intermediate nodes to the computer 104 on which the system 102 resides.

Accordingly, the system 102 can comprise one or more software modules configured to execute on a general-purpose or application-specific computer based, for example, on the known von Neumann architecture. Accordingly, the system can comprise computer-readable code comprising a set of instructions that when loaded onto and executed by a computing device causes the device to perform the processes and functions described herein. Thus, such software modules can provide the needed functionality for creating probabilistic products, according to one embodiment of the invention. In an alternative embodiment, however, system 102 can be implemented in dedicated hardwired circuitry for performing the functions of the system. In yet another embodiment, the system 102 can be implemented as a combination of software code and hardwired circuitry.

Figure 2:
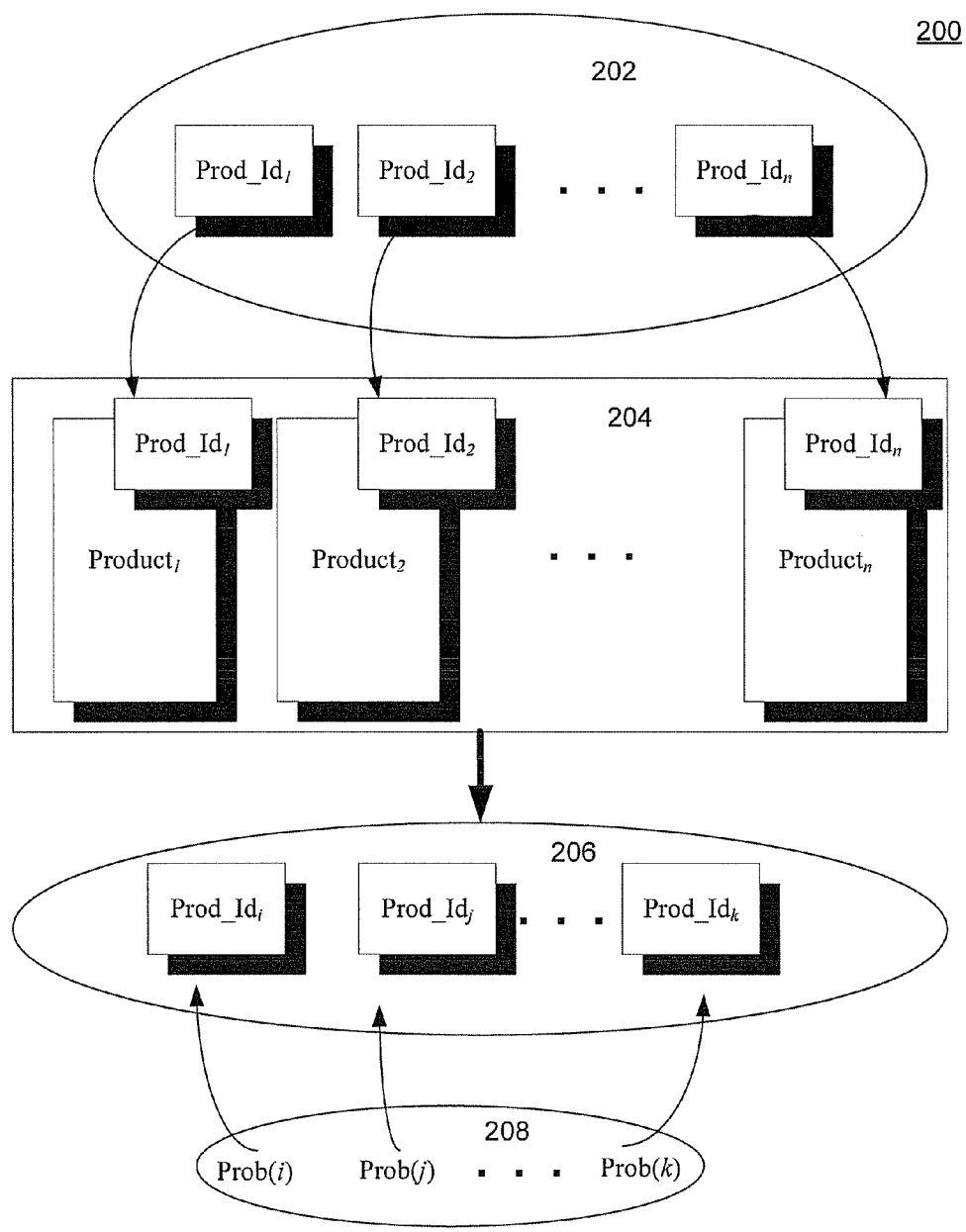
FIG. 2 is a schematic view of various aspects of creating a probabilistic product according one embodiment of the invention.

Referring additionally to FIG. 2, the operative procedures 200 performed by the system 102 are schematically illustrated. Initially, a set of product identifiers 202 is created, the product identifiers corresponding to a plurality of items or products 204 offered by a single seller. The set of product identifiers 202 are used to identify distinct items or products among the plurality of items or products 204. Accordingly, the system 102 associates the product identifiers with the distinct products such that each product identifier uniquely corresponds to a particular one of the plurality of products 204.

As already described, each item or product belonging to an item set comprising the probabilistic product can be a different product or a different version of the same product, each version having one or more attributes whose particular value or values are different from those of other products in the set. Accordingly, each product identifier associated with a particular product can be a scalar number or alphanumeric characters that uniquely identifies the particular product. For example, such a product identifier can be a stock keeping unit (SKU), as will be readily understood by one of ordinary skill in the art.

In another embodiment, however, the set of product identifiers 202 can comprise a set of n-tuples, or attribute vectors. For example, the i-th product identifier corresponding to the i-th product having n different attributes could be represented as follows:

$$\text{Prod\_Id}_i = <a_1, a_2, \ldots a_n>,$$

where each $a_k$, $1 \leq k \leq n$, can take a different value depending on the number of different values are assigned to the k-th attribute of the i-th product. As described below, according to the invention, there is a probability (perhaps zero) that the buyer of the probabilistic product will receive a product described by any particular n-tuple. The probabilities are assigned by the system 102, as also described below.

The system 102 then selects a subset of the product identifiers 206, illustratively comprising $\text{Id}_i$, $\text{Id}_j$, ..., $\text{Id}_k$. For the product identifiers contained in the subset 206, the system 102 generates a plurality of probability values 208 such that each probability value uniquely corresponds to one of the product identifiers contained in the subset, and such that the sum of the probability values equals one:

$$\sum_{\forall i} Prob(i) = 1.$$

The probability values corresponding to the exemplary subset are schematically shown as $\text{Prob}_i$, $\text{Prob}_j$, ..., $\text{Prob}_k$. As already noted, each of the product identifiers can comprise an n-tuple or product vector, each element of which corresponds to a particular value for each of a plurality of attributes. Accordingly, each such probability can comprise a multivariate probability value corresponding to a multivariable probability distribution.

The probabilistic product created by the system 102 is accordingly defined by the products corresponding to the identifiers in the subset 206 and their respective corresponding probabilities. By paying the seller's price for the probabilistic product, a buyer will receive that product associated with one of the product identifiers randomly chosen from the subset, wherein the probability of choosing a particular product identifier is equal to the probability value corresponding to that particular product identifier.

Different combinations of products, identified by the associated product identifiers, give rise to distinct probabilistic products. Thus, for example, by selecting i products to include in the subset, a seller of n distinct products can arrive at the following number of different probabilistic products:

$$\binom{n}{i} = \frac{n!}{(n-i)!i!}.$$

The number of distinct probabilistic products, moreover, increases by varying the number of products i, $2 \leq i \leq n$, included in the subset and well as the respective probabilities, subject to the constraint that the sum of probabilities equals one.

Accordingly, the identity of the products, the number of products, and the respective probabilities, each define critical variables. By modifying one or more of the critical variables, the system 102 can generate different probabilistic products.

Figure 3:
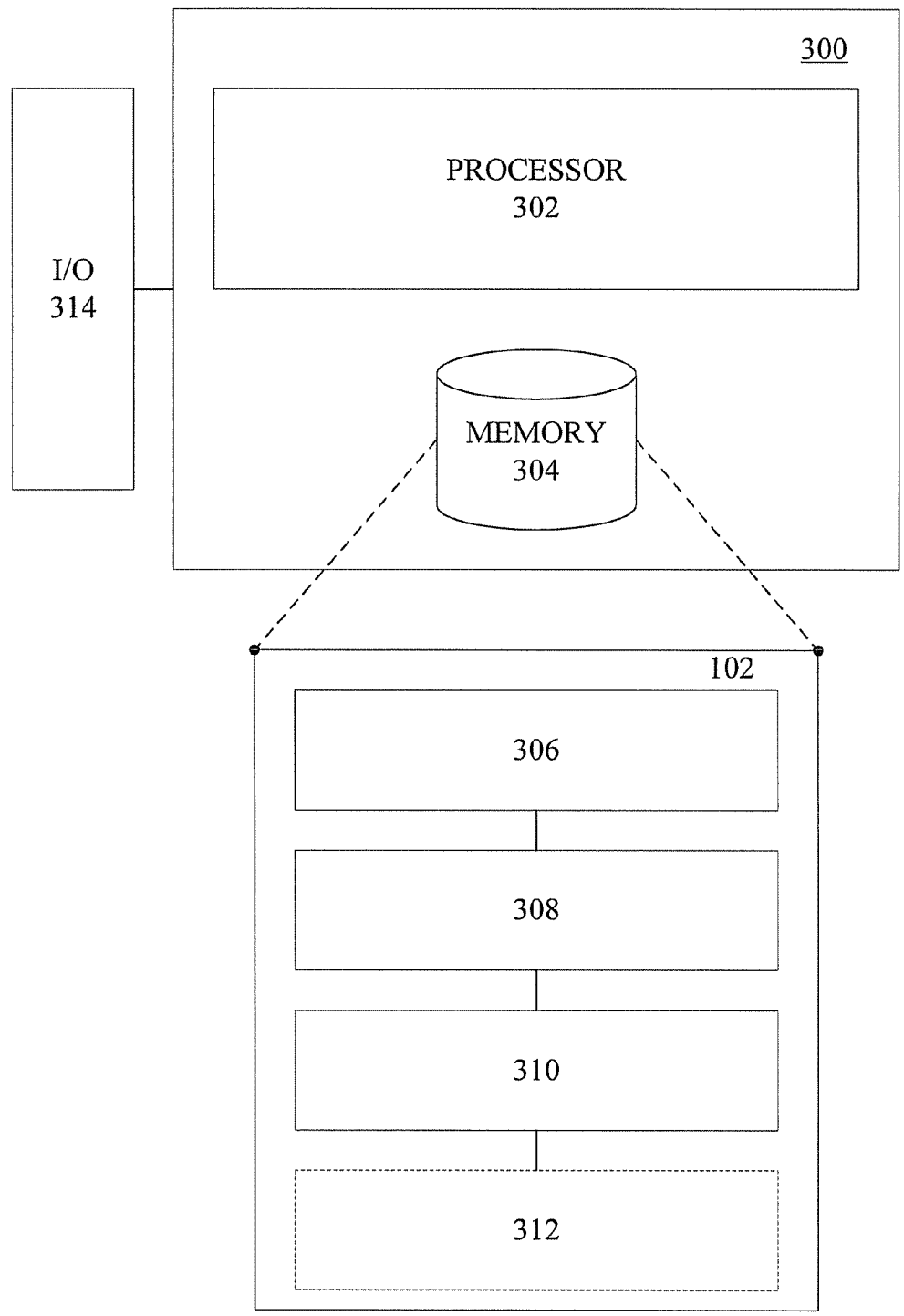
FIG. 3 is a schematic view of a system for creating probabilistic products, according to one embodiment of the invention.

The system 102, moreover, can determine a monetary value, defining a selling price, for a particular probabilistic product. The price can be based upon one or more of the critical values, or upon other factors A high-level view of one embodiment of the system 102 is schematically illustrated in FIG. 3. The system 102 comprises a plurality of software modules that reside within a computer 300. The computer 300 illustratively includes a processor 302 and memory 304, which stores the modules of the system 102 as program instructions that when transferred by a conventional bus (not shown) to the process can be executed to carry out the procedures already described. Illustratively, the system 102 includes an identifier-generating module 306 for creating a set of product identifiers corresponding to a plurality of products offered by a single seller, wherein each of the plurality of product identifiers uniquely corresponds to one of the plurality of products. The system 102 also illustratively includes a selecting module 308 for selecting a subset of the product identifiers. Additionally the system illustratively includes a probability-generating module 310 for generating a plurality of probability values, each probability value uniquely corresponding to one of the product identifiers contained in the subset, wherein the sum of the probability values equals one.

As already noted, the subset and corresponding probabilities define a single probabilistic product. The probabilistic product can be generated based upon user input supplied to the system 102 through an interface or I/O device 314 communicatively linking the user to the computer 300. By varying the critical inputs defined above and inputting the changes via the I/O device 314, the system 102 can select a plurality of subsets, repeatedly performing for each the generating and determining procedures described above so as to generate a plurality of different probabilistic products. When the computer is connected to a data communications network, offers for one or more probabilistic products can be communicated to a plurality of buyers at different network-connected nodes communicatively linked to the data communications network.

Optionally, the system 102 can include a value-determining module 312 for determining a monetary value. The monetary value is a selling price, wherein, by paying the selling price, a buyer will receive a product associated with one of the product identifiers randomly chosen from the subset. Moreover, the probability of choosing a particular product identifier is equal to the probability value corresponding to the particular product identifier. In an alternative embodiment, the system 102 can include a value-determining module that is specifically configured to determine the selling price, wherein the selling price is specifically determined based upon how many products are selected and/or the probabilities corresponding to each of the products selected.

According to one embodiment, the seller determines (1) how many products are selected, (2) which products are selected, and/or (3) the probability values assigned to each product selected. If the seller determines each of the critical variables, the seller can convey an offer that includes information informing the buyer of less than all the critical variables. The price can vary accordingly so as to make the probabilistic purchase still valuable to at least some buyers.

In an alternate embodiment it is the buyer who determines one or more of these critical values. The buyer, more particularly, can effect the determination in response to an offer conveyed to a plurality of network-connected nodes communicatively linked to a data communications network.

Figure 4:
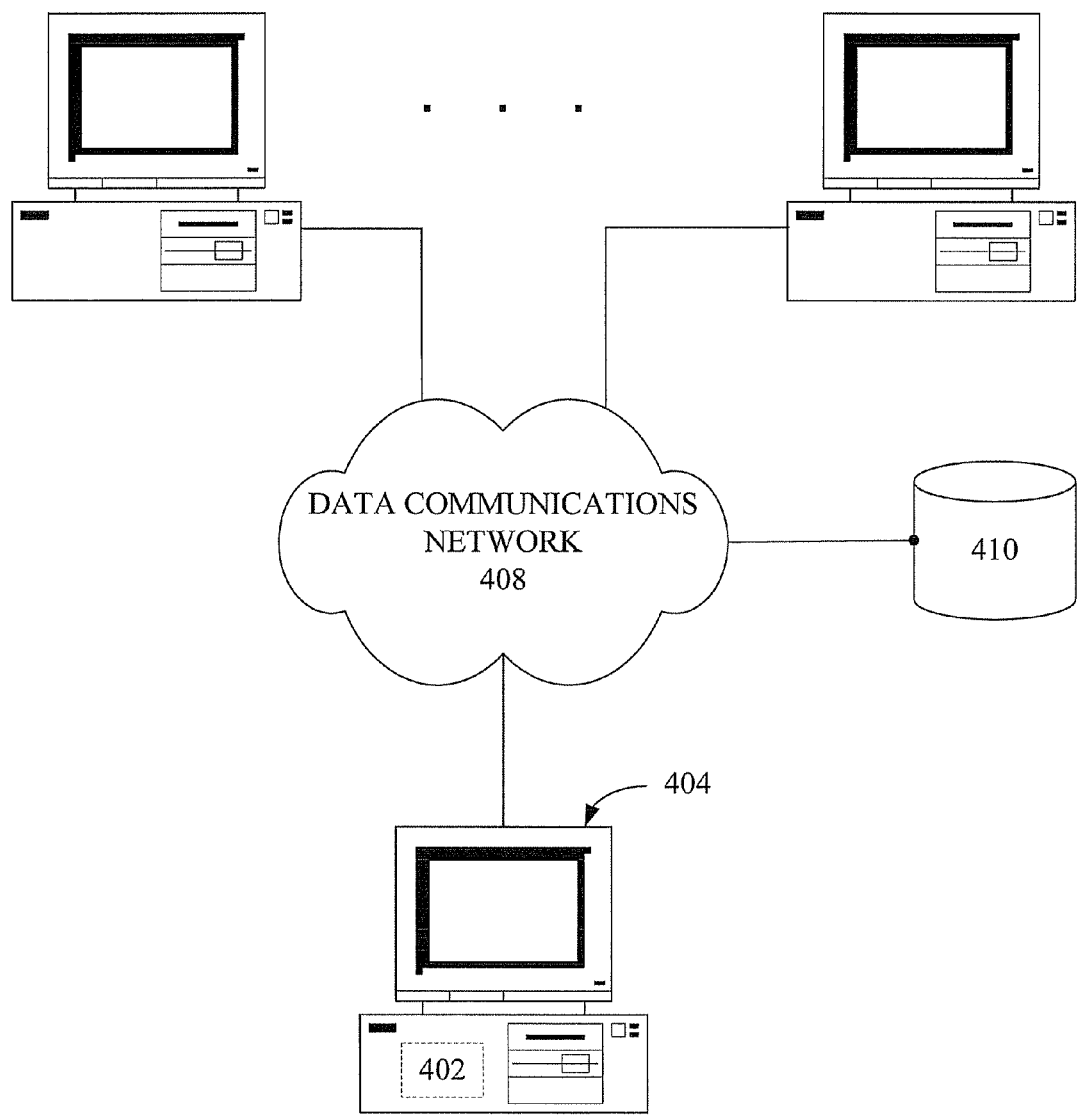
FIG. 4 is a schematic view of an exemplary environment in which a system for monitoring probabilistic selling, according to another embodiment of the invention, is utilized.

FIG. 4 is a schematic view of an exemplary environment 400 in which a system 402 for monitoring the selling of a probabilistic product, according to another embodiment, is utilized. The exemplary environment 400 illustratively includes a computer 404 on which the system 402 resides. The computer is illustratively linked to a plurality of other computers 406 via a data communications network 408. Additionally, the computer 404 and each of the other computers 406 are linked to a database 410 via the data communications network 408.

Figure 5:
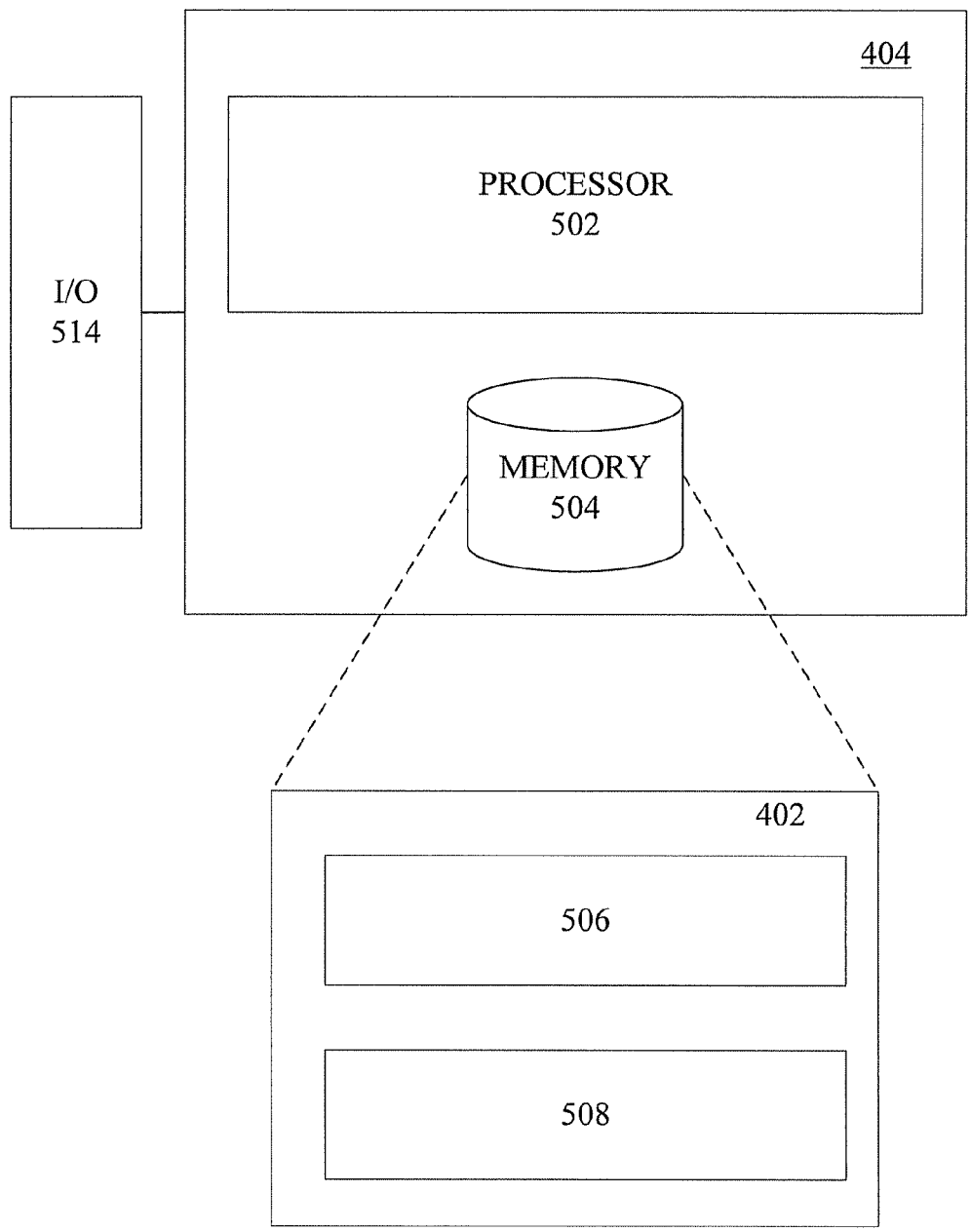
FIG. 5 is a schematic view of a system for monitoring probabilistic selling, according to another embodiment of the invention.

Referring additionally to FIG. 5, the system 402 is schematically shown as comprising distinct software modules configured to be executed by a processor 502 and stored in a memory 504 of the computer 404. The software modules comprise computer instructions for performing functions for monitoring selling of a probabilistic product. In alternative embodiments, however, the modules can be implemented in dedicated, hardwired circuitry or a combination of hardwired circuitry and software code.

The system 402 illustratively includes a tracking module 506 for tracking purchases of at least one probabilistic product offered by at least one seller, the at least one probabilistic product being defined by a plurality of distinct products and a plurality of probabilities associated therewith, wherein each of the probabilities uniquely corresponds to one of the distinct products. Additionally, the system 402 illustratively includes an information-generating module 508 for generating transaction information associated with each of the purchases tracked.

The information-generating module 508 can be configured to generate transaction information by determining, for each purchase of one or more probabilistic products, which of the plurality of products was provided to a buyer. The purchases can be tracked and the information generated based upon data received via an I/O device 514 of the computer 404 and/or data received over a connection to the other computers 406 when connected via the data communications network 408.

According to a particular embodiment, the system 402 can be maintained and operated by an entity independent of the sellers whose sales of probabilistic products the entity monitors. The independent entity, moreover, can be tasked with randomly choosing a particular product from among the plurality of distinct products according to the probabilities associated therewith. Additionally, the independent entity can, according to another embodiment, determine when a seller and a buyer have agreed upon a price for at least one probabilistic product. In response, the entity can randomly choose a particular product. The independent entity also can be tasked with providing to the buyer the particular product randomly chosen according to the described procedure.

The entity thus can be an intermediary that specializes in directly making product assignments for one or more sellers that offer probabilistic products. The entity can collect and provide related information to consumers. One of the benefits provided through such an arrangement is that it can enhance the credibility of the seller or sellers that are independently monitored.

In particular, once a seller and buyer commit to a particular probabilistic product at a particular price, relevant information can be sent to the entity. Acting as both parties' intermediary, the entity can select the product, randomly, and then inform both the buyer and the seller of the outcome of the entities' random selection. Acting in this fashion, the entity provides assurance that the transaction for the probabilistic product is consummated with integrity; the entity is invested in its own reputation and is thus less likely than an interested party to deviate from the terms of the transaction when the random selection of the actual product is made.

Whether obtained by the seller or an independent entity, related transaction information such as the history of past product transactions and assignments can be stored in a network-connected database 410. The database 410 can be accessed at the various computers 406 connected via to the database via the data communications network. The database, by providing relevant transaction information, can enhance a seller's credibility by providing information about the seller's past dealings with other buyers of probabilistic products.

The invention has thus far been described in the context of a data processing system that, according to one embodiment, can be utilized as part of a data communications network. It is expressly noted, however, that the invention applies more generally. For example, the invention can be implemented using an electronic or even a non-electronic random number generator, such as a conventional die, wherein a customer rolls the die and, depending on the outcome, a salesperson or other entity selects and dispenses the corresponding item drawn from the set of items comprising the probabilistic product.

Figure 6:
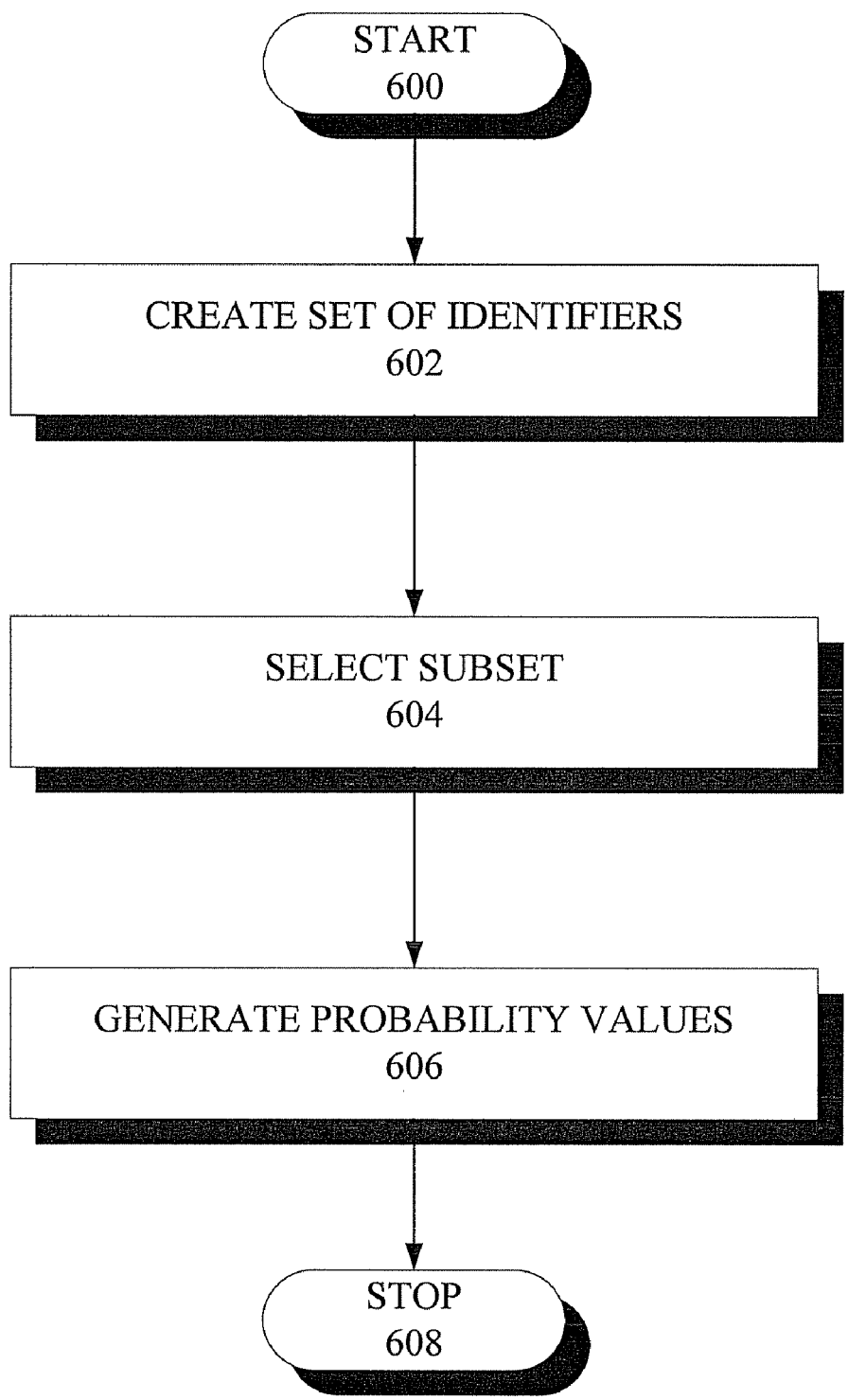
FIG. 6 is a flowchart of exemplary steps in a method for creating a probabilistic product, according still another embodiment of the invention.

A method aspect of the invention is illustrated by the flowchart of FIG. 6. The flowchart includes the exemplary steps of a method 600 for creating a probabilistic product by varying a plurality of predefined critical variables, according to another embodiment of the invention.

The method 600 includes, at step 602, creating a set of product identifiers corresponding to a plurality of products offered by a single seller, wherein each of the plurality of product identifiers uniquely corresponds to one of the plurality of products. The method 600 further includes selecting a subset of the product identifiers at step 604, and at step 606, generating a plurality of probability values, each probability value uniquely corresponding one of the product identifiers contained in the subset (the probability values summing to one). The method illustratively concludes at step 608.

Optionally, the method 600 can also include determining a monetary value, defining a selling price. By paying the selling price to the seller, a buyer will receive a product associated with one of the product identifiers randomly chosen from the subset. According to one embodiment, the selling price, moreover, can be determined based upon how many products are selected and the probabilities corresponding to each of the products selected.

The probability of choosing a particular product identifier is equal to the probability value corresponding to the particular product identifier, according to the invention. Thus, the subset and corresponding probabilities can define the single probabilistic product created according to the method. The method can further include selecting a new subset and repeating the generating step and determining step to create another probabilistic product. For each probabilistic product created, an offer for the probabilistic product can be conveyed to a plurality of buyers at different network-connected nodes communicatively linked to a data communications network.

The amount of information conveyed in the offer, moreover, can vary, and the price of the probabilistic product can be altered according to how much information is provided. The information can include: (1) how many products are selected; (2) which products are selected; and (3) the probability values assigned to each product selected. According to one embodiment, the seller determines each of the variables. In an alternative embodiment, however, the buyer is offered an opportunity to choose one or more of the variables, and by doing so, can affect the selling price.

Figure 7:
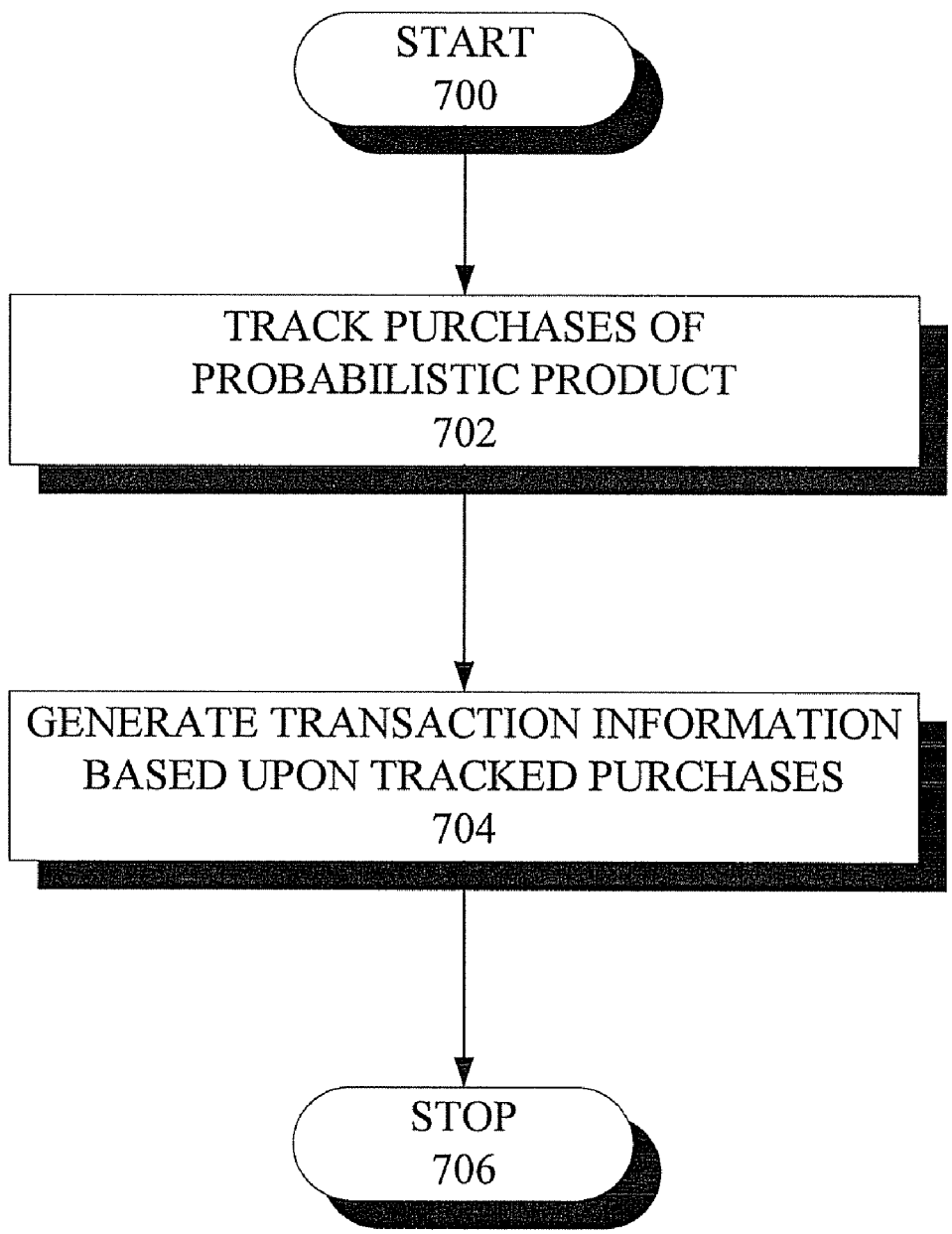
FIG. 7 is a flowchart of exemplary steps in a method for monitoring probabilistic selling, according yet another embodiment of the invention.

Another method aspect of the invention is a method 700 of monitoring the selling of a probabilistic product, the method illustrated by the exemplary steps of the flowchart of FIG. 7. The method 700 illustratively includes tracking purchases of at least one probabilistic product offered by at least one seller at step 702, wherein the at least one probabilistic product is defined by a plurality of distinct products and a plurality of probabilities associated therewith, each of the probabilities uniquely corresponding to one of the distinct products. The method 700 further illustratively includes, at step 704, generating transaction information associated with each of the purchases tracked. The step of generating transaction information, according to a particular embodiment, can comprise determining for each purchase of the at least one probabilistic product which of the plurality of products was provided to a buyer. Additionally, or alternately, the step can include generating additional transaction information comprising at least one of (1) the price agreed upon, (2) the product randomly chosen, and (3) the probability corresponding to the random choice, and storing the additional transaction information. The method illustratively concludes at step 706.

According to one embodiment of the invention, the method steps are performed by the seller of the probabilistic product. The seller can provide access to a network-based database that provides to prospective buyers relevant information regarding past purchases by others.

Alternatively, however, the method steps can be performed by an independent entity. The entity can further perform the step of randomly choosing a particular product from among the plurality of distinct products according to the probabilities associated therewith. The entity also can determine when the seller and a buyer have agreed upon a price for the at least one probabilistic product and, in response thereto, randomly choose the particular product. Moreover, the entity can provide to a buyer the particular product randomly chosen.

One application of the invention is as a marketing technique that offers a number of distinct advantages to a seller. The invention enables a seller to engage in probabilistic selling, which the inventors have shown can be used to create opportunities for price discrimination such that the seller is able to distinguish buyers who have strong preferences from those who have weak preferences across one or more of the attributes of the items comprising a probabilistic product. A discounted probabilistic product can attract buyers with weaker preferences, whereas the products attract buyers with stronger preferences. Probabilistic selling can enable the seller to potentially sell to additional consumers and/or to derive greater consumer surplus per sale, on average. This benefit can be achieved even if all buyers prefer the same product so long as the buyers differ in the strength of these preferences. Because the creation of probabilistic products does not require the development of new physical products, product line extension can be accomplished in a virtual fashion at reduced or minimal cost.

Another application of the invention is as a technique for dealing with demand uncertainty. Probabilistic selling can be particularly advantageous for a seller when the seller can not perfectly forecast the individual demand for the different items comprising the probabilistic product. This is because probabilistic selling can mitigate or even eliminate the dependence of a multi-product seller's pricing decision on demand for each individual item comprising the probabilistic product. Additionally, probabilistic selling can improve capacity usage rates and also ensure that capacity will be reserved for those consumers with strong preferences for a particular item of the probabilistic product.

The invention, as already noted, can be realized in hardware, software, or a combination of hardware and software. The invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The invention, as also noted already, can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The foregoing description of preferred embodiments of the invention has been presented for the purposes of illustration. The description is not intended to limit the invention to the precise forms disclosed. Indeed, modifications and variations will be readily apparent from the foregoing description. Accordingly, it is intended that the scope of the invention not be limited by the detailed description provided herein.

We claim:

1. A method for creating a probabilistic product, the method comprising:
   obtaining, using a computer, a set of product identifiers corresponding to a plurality of products offered by a seller, wherein each of the plurality of product identifiers uniquely corresponds to one of the plurality of products;
   selecting a subset of the product identifiers using a selecting module executing on the computer;
   generating, using the computer, a plurality of probability values, each probability value uniquely corresponding to one of the product identifiers contained in the subset, wherein a sum of the probability values equals one;
   determining, using the computer, a monetary value, defining a selling price, wherein by paying the selling price to the seller, a buyer will receive a product associated with one of the product identifiers randomly chosen from the subset, and wherein a probability of choosing a particular product identifier is equal to the probability value corresponding to the particular product identifier;
   defining the subset and corresponding probabilities of a single probabilistic product;
   communicating an offer for the probabilistic product to a plurality of buyers that identifies the probability values corresponding to the product identifiers contained in the subset to the buyers; and
   adjusting the selling price for a buyer in response to that buyer choosing probability values for the product identifiers contained in the subset.

2. The method of claim 1, further comprising selecting a plurality of subsets and repeating for each of the plurality of subsets the generating and determining.

3. The method of claim 1, further comprising communicating the offer for the probabilistic product to a plurality of buyers at different network-connected nodes communicatively linked to a data communications network.

4. A method for creating a probabilistic product, the method comprising:
   selecting a plurality of products from among an inventory of products offered by a seller using a selecting module executing on a computer;
   associating, using the computer, a plurality of product identifiers with the selected plurality of products, wherein each of the plurality of product identifiers uniquely corresponds to one of the plurality of products;
   assigning, using the computer, a plurality of probability values, each probability value uniquely corresponding to one of the product identifiers wherein a sum of the probability values equals one; and
   determining, using the computer, a monetary value, defining a selling price, wherein by paying the monetary value to the seller a buyer will receive a product associated with one of the product identifiers randomly chosen from the subset, wherein a probability of choosing a particular product identifier is equal to the probability value corresponding to the particular product identifier;
   determining the selling price based upon how many products are selected and the probabilities corresponding to each of the products selected;
   communicating an offer for the probabilistic product to a plurality of buyers that identifies the probability values corresponding to the product identifiers contained in the subset to the buyers; and
   adjusting the selling price for a buyer in response to that buyer choosing probability values for the product identifiers contained in the subset.

5. The method of claim 4, wherein the seller determines at least one of (1) how many products are selected; (2) which products are selected; and (3) the probability values assigned to each product selected.

6. The method of claim 4, wherein the buyer determines at least one of (1) how many products are selected; (2) which products are selected; and (3) the probability values assigned to each product selected.

7. The method of claim 6, wherein the buyer is offered an opportunity to effect the at least one determination by responding to an offer conveyed to a plurality of network-connected nodes communicatively linked to a data communications network.

8. The method of claim 7, wherein the seller determines (1) how many products are selected, (2) which products are selected, and (3) the probability values assigned to each product selected, each defining a critical variable, and wherein the offer includes information informing the buyer of less than all the critical variables.

9. A method for creating a probabilistic product, the method comprising:
   creating, using a computer, a set of product identifiers corresponding to a plurality of products offered by a seller, wherein each of the plurality of product identifiers uniquely corresponds to one of the plurality of products;
   selecting, using the computer, a subset of the product identifiers;
   generating, using the computer, a plurality of probability values, each probability value uniquely corresponding to one of the product identifiers contained in the subset, wherein a sum of the probability values equals one;
   determining, using the computer, a monetary value, defining a selling price, wherein by paying the selling price to the seller a buyer will receive a product associated with one of the product identifiers randomly chosen from the subset, wherein a probability of choosing a particular product identifier is equal to the probability value corresponding to the particular product identifier; and
   wherein the subset and corresponding probabilities define a single probabilistic product;
   conveying to a plurality of buyers at different network-connected nodes over a data communications network an offer for the probabilistic product including identifying the probability values corresponding to the product identifiers contained in the subset to the buyers;
   tracking each purchase of the probabilistic product and storing related transactions information associated with each purchase;
   providing access to the related transactions information; and
   adjusting the selling price for a buyer in response to that buyer choosing probability values for the product identifiers contained in the subset.

10. The method of claim 9, wherein the related transactions information comprises at least one of (1) which products comprise the probabilistic product and (2) the probability of a particular product being chosen.

11. The method of claim 9, wherein the related transactions information is updated for each successive purchase of the probabilistic product.

12. The method of claim 9, further comprising providing access to the related transactions information when it is stored in a database accessible via the data communications network.

13. The method of claim 9, wherein tracking each purchase and storing related transaction information is performed by an entity other than the seller.

14. The method of claim 13, wherein the entity also performs providing access to the related transactions information.

* * * * *